(12) United States Patent
Biggel et al.

(10) Patent No.: US 8,740,603 B2
(45) Date of Patent: Jun. 3, 2014

(54) SHAPING AND COOLING DEVICE FOR A FLOWABLE, MELTED FOOD MASS

(75) Inventors: Andreas Biggel, Hergatz (DE); Franz Stadelmann, Opfenbach (DE)

(73) Assignee: Hochland SE, Heimkirchen (DE)

( * ) Notice: Subject to any disclaimer, the term of this patent is extended or adjusted under 35 U.S.C. 154(b) by 0 days.

(21) Appl. No.: 13/578,637

(22) PCT Filed: Dec. 14, 2010

(86) PCT No.: PCT/EP2010/007617
§ 371 (c)(1),
(2), (4) Date: Aug. 13, 2012

(87) PCT Pub. No.: WO2011/098108
PCT Pub. Date: Aug. 18, 2011

(65) Prior Publication Data
US 2012/0308679 A1    Dec. 6, 2012

(30) Foreign Application Priority Data

Feb. 15, 2010   (DE) .......................... 10 2010 007 984

(51) Int. Cl.
*A01J 25/12*    (2006.01)

(52) U.S. Cl.
USPC .......................................... 425/371; 425/446

(58) Field of Classification Search
USPC .................. 425/327, 371, 471, 223, 224, 446
See application file for complete search history.

(56) References Cited

U.S. PATENT DOCUMENTS

| 2,742,876 | A |   | 4/1956  | Duncan |   |
|---|---|---|---|---|---|
| 3,988,098 | A | * | 10/1976 | Kato et al. | 425/371 |
| 4,004,870 | A | * | 1/1977  | Guttinger et al. | 425/371 |
| 4,311,657 | A | * | 1/1982  | Koster | 425/371 |
| 4,696,779 | A | * | 9/1987  | Wideman | 425/325 |
| 5,527,551 | A | * | 6/1996  | Fager et al. | 425/371 |
| 6,009,803 | A | * | 1/2000  | Pankoke et al. | 425/371 |
| 6,264,767 | B1 |  | 7/2001  | Frank et al. |   |
| 2002/0027309 | A1 | * | 3/2002 | Fujii et al. | 425/371 |
| 2007/0098861 | A1 | * | 5/2007 | Biggel | 426/512 |

FOREIGN PATENT DOCUMENTS

| DE | 832297 C | 2/1952 |
|---|---|---|
| DE | 3145145 C | 6/1989 |
| JP | H10277624 A | 10/1998 |

OTHER PUBLICATIONS

Kessler, "Bio Process Engineering", Dairy Technology (2002) p. 428 (Kessler, Munich, Germany).

* cited by examiner

*Primary Examiner* — James Mackey
(74) *Attorney, Agent, or Firm* — Stolmar & Partner; Robert Lelkes

(57) ABSTRACT

The invention relates to a forming and cooling device for a flowable, melted food mass 1, more particularly processed cheese, comprising two parallel, oppositely rotating cooling belts 2, 3, which are each guided over an upper 4 and a lower 5 deflection roller and are separated from each other in order to form a continuous strip 6 of the food mass, wherein the cooling belts 2, 3 are each acted upon by a cooling fluid 7 on the side facing away from the strip, characterized in that a tubular supply channel 8 is formed at the upper region of each cooling belt 2, 3 and is equipped with a plurality of outlet conduits 9 arranged side by side, the central recess of which is cylindrically formed and by way of which a laminar, non-turbulent cooling-liquid stream 10 can be placed upon the cooling belt 2, 3.

13 Claims, 7 Drawing Sheets

SHAPING AND COOLING DEVICE FOR A FLOWABLE, MELTED FOOD MASS

CROSS-REFERENCE TO RELATED APPLICATIONS

This application is based on international patent application no. PCT/EP2010/007617 filed on 14 Dec. 2010, which claims priority from German patent application no. 102010007984.7 filed on 15 Feb. 2010.

BACKGROUND OF THE INVENTION (1) Field of the Invention

The invention relates to a forming and cooling device for a flowable, melted food mass.

Specifically, the invention relates to a forming and cooling device as is generally known from DE 103 28 905 A1.

(2) Description of Related Art

DE 103 28 905 A1 shows a device, as depicted in FIG. 1, in which a melted food mass 1, more particularly processed cheese, is rolled and cooled to form a continuous strip 6. To this end, the device comprises two oppositely rotating, endless cooling belts 2, 3, each of which is guided over an upper deflection roller 4 and a lower deflection roller 5. The two cooling belts 2, 3, which are preferably designed as steel belts, are spaced apart from one another in order to form the strip 6 of the food mass (processed cheese).

Each side of the cooling belts 2, 3 facing away from the strip 6 of food mass is acted upon by a cooling fluid 7 in order to cool the melted food mass.

The cooling of the food mass requires uniform cooling and good dissipation of the heat quantity introduced by the food mass. It is also necessary to supply and drain off the cooling fluid (water) in a reliable manner.

The problem addressed by the invention is that of creating a device of the initially-mentioned type that ensures reliable cooling while having a simple design and simple, cost-favorable manufacturability and that is characterized by a high degree of operational dependability.

BRIEF SUMMARY OF THE INVENTION

The problem is solved according to the invention by forming and cooling device for a flowable, melted food mass (1), more particularly processed cheese, comprising two parallel, oppositely rotating cooling belts (2, 3), which are each guided over an upper (4) and a lower (5) deflection roller and are separated from each other in order to form a continuous strip (6) of the food mass, wherein the cooling belts (2, 3) are each acted upon by a cooling fluid (7) on the side facing away from the strip, characterized in that a tubular supply channel (8) is formed at the upper region of each cooling belt (2, 3) and is equipped with a plurality of outlet conduits (9) arranged side by side, the central recess of which is cylindrically formed and by way of which a laminar, non-turbulent cooling-liquid stream (10) can be placed upon the cooling belt (2, 3). The dependent claims show further advantageous embodiments of the invention.

BRIEF DESCRIPTION OF THE DRAWINGS

The invention is described in the following by reference to an exemplary embodiment in combination with the drawing. Shown are.

DETAILED DESCRIPTION OF THE INVENTION

Figure 1:
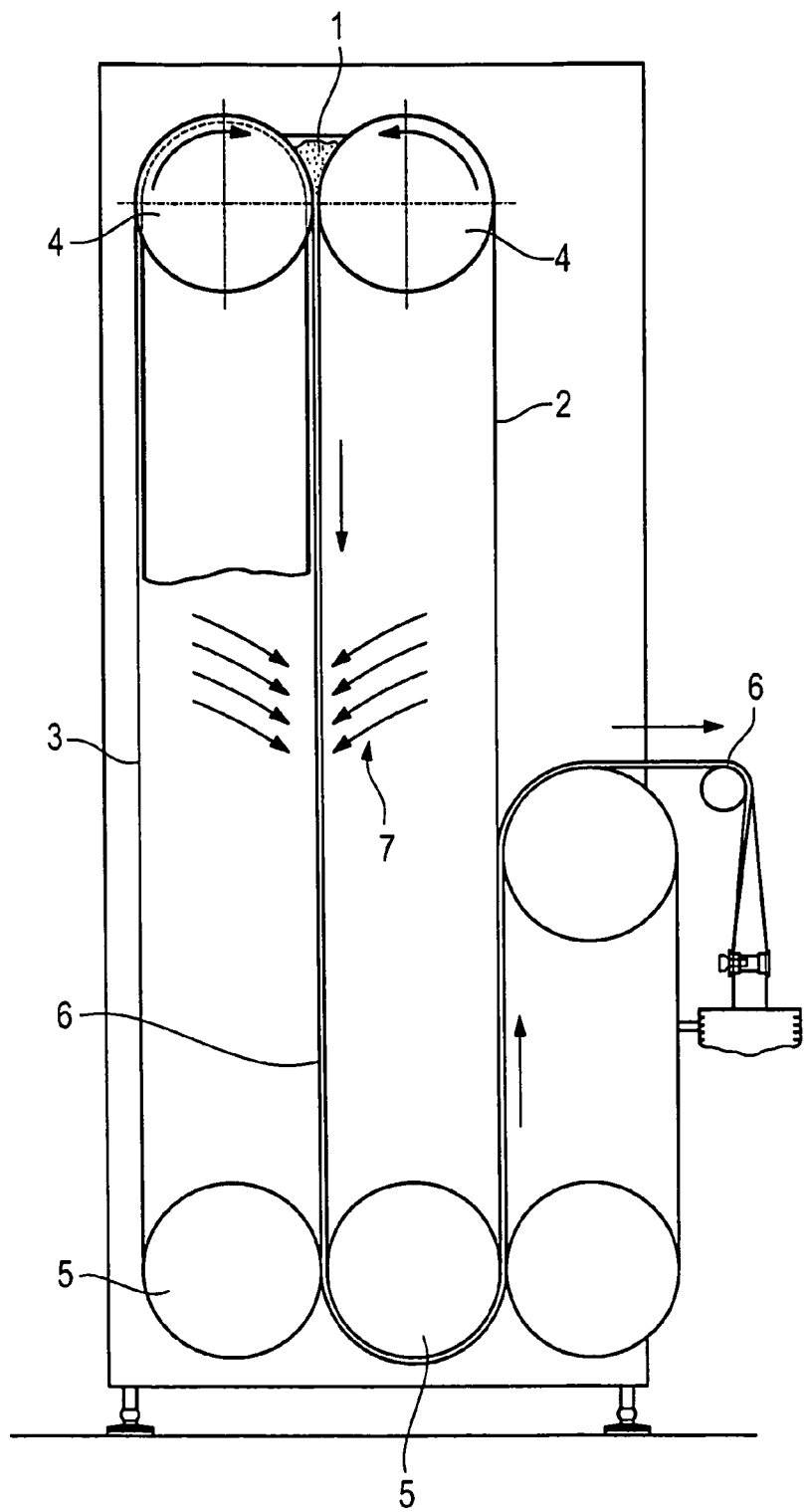
FIG. 1 a schematic side sectional view according to the prior art.

According to the invention, a forming and cooling device for a flowable, melted food mass is therefore created, in which a tubular supply channel equipped with a plurality of outlet conduits arranged side by side is disposed at the upper region of the particular cooling belt. The outlet conduits are designed such that they place a laminar layer of cooling fluid upon the surface of the cooling belt. To this end, the outlet conduits are equipped with a cylindrical recess from which a laminar outflow of the cooling fluid results. According to the invention, the possibility is therefore created of applying the cooling fluid without the risk of spraying and of applying a cooling fluid having a uniform thickness and a constant width. In contrast to the prior art, the possibility is therefore created of applying the cooling film uniformly in terms of the thickness thereof and the width thereof and, therefore, of ensuring optimized heat transfer between the surface of the cooling belt and the preferably turbulently flowing cooling-fluid film. It is therefore not expected, as is partially the case in the prior art, that a non-uniformly distributed, turbulently flowing-off and inconsistently thick cooling-liquid film will form.

By way of the embodiment according to the invention it is therefore possible to carry out cooling uniformly from both sides. This is also advantageous in terms of uniform cooling and reliable formation of the strip of the food mass.

According to the invention it is particularly favorable when the supply channel forms a storage volume. As a result it can be ensured that the outflow of cooling fluid from the outlet conduits takes place in a slow, constant and laminar manner, while a turbulent flow formation can also be expected in the supply channel if pressure is higher and inflow conditions are unfavorable. The storage volume provided according to the invention, the pressure of which can be 0.05 bar to 0.3 bar, for example, ensures uniform outflow of the cooling fluid from all outlet conduits, thereby also resulting in consistent flow conditions across the entire width of the cooling belt.

According to the invention, the embodiment is therefore designed such that the cooling-water supply (flow) does not have an unfavorable effect on the outflow through the outlet conduits. More particularly, the kinetic energy of the inflowing flow and the pressure distribution do not restrict the outflow through the outlet conduits.

The outlet conduit is preferably arranged at an angle with respect to the surface of the cooling belt, for example at an angle between 40° and 60°. A particularly favorable placement of the cooling-fluid film takes place as a result.

Furthermore, it is favorable according to the invention that a plurality of outlet conduits is provided, which are distributed uniformly across the width of the cooling belt. The uniform, laminar fluid outflow and the formation of the uniform cooling-fluid film flowing down in a laminar manner is obtained as a result.

The outlet conduits preferably have a ratio of length to diameter of 5 to 9. Uniform flow is ensured as a result.

In order to remove the cooling fluid that runs off in the form of the cooling-fluid film from the surface of the cooling belt, it is particularly favorable according to the invention when a run-off element for draining off the cooling fluid is provided underneath the supply channel. The run-off element is preferably designed in the form of an outflow gutter through which the cooling fluid can be drained off in a spray-free and uniform manner due to the sufficient volume of the outflow gutter. It proves particularly favorable when the run-off element comprises a scraper bearing against the inner side of the cooling belt that is preferably elastically preloaded against the surface of the cooling belt. The scraper therefore removes the cooling-fluid film in a uniform manner. The scraper, the plug-and-socket connections of the scraper and the outflow gutter are designed smooth and free of interfering components (screws, for example) in the course of the inflowing cooling water, thereby allowing the cooling water to flow into the outflow gutter without spraying.

In order to permit replacement of the scraper in a simple manner and with little complexity if it should become worn, it is favorable when the scraper is supported at the run-off element by way of a plug-and-socket connection.

The drainage of the cooling-liquid film provided according to the invention does not require additional external energy, as would be the case, for example, for pumping away. Furthermore, the device is designed such that very little noise is produced.

A further, significant advantage of the device according to the invention is that the scraper can be supported at the run-off element in a floating manner due to the plug-and-socket connection thereof. As a result, no deformations of the scraper result due to a clamped connection or the like or due to temperature differences, and so leaks cannot form between the scraper and the surface of the cooling belt due to a deformation of the scraper (wavy deformation).

It is furthermore advantageous that the drainage of the cooling fluid takes place through the outflow gutter by way of gravity, and therefore no components need to be provided that are susceptible to interference and can fail.

In a favorable development of the invention it is provided that the supply channel is equipped with an adjusting device, by way of which a supply of cooling fluid to some of the outlet conduits can be adjusted. The effective working width of the cooling device can be adjusted by way of the adjusting device. It is possible, more particularly, to seal some of the outwardly lying outlet conduits with respect to the supply of cooling fluid, and so the cooling fluid only flows out of a central region of the cooling device. The application of the cooling fluid (cooling water) can therefore be adjusted in terms of width symmetrically and steplessly from both sides. In so doing it is particularly favorable when the adjusting device comprises at least one piston that is displaceable within the supply channel. Preferably two pistons are provided, in order to symmetrically seal the outlet conduits provided in the outwardly located end regions against an inflow of cooling fluid. Therefore, cooling fluid does not flow through said outlet conduits, but rather is discharged through the relevant outlet conduits only in the central region and is fed to the cooling belt.

The pistons are preferably actuated by way of a drive or even by a hand crank that comprises a spindle, for example, that can be actuated via a servo drive. The piston is thereby displaced within the housing of the supply channel, thereby permitting cooling fluid to flow only to the centrally disposed outlet conduits, while the outlet conduits positioned outside of the piston cannot be acted upon by cooling fluid. It is thereby made possible to perform an adjustment without the risk of spraying or dripping. The spindle is preferably equipped with a counter-rotating thread in order to move both pistons synchronously in a mirror image manner.

In a favorable development of the invention it is provided that a run-off opening is provided at each lateral end region of the supply channel, through which a desired leakage flow through the piston is drained. This leakage flow is also favorable for CIP cleaning since it is possible, as a result, to reliably clean the entire adjusting mechanism.

A further, essential advantage of the forming and cooling device according to the invention is that it is easy to clean. No hidden internal spaces result, but rather a uniform flow of cleaning fluid is possible, and so CIP (clean-in-place) cleaning, in particular, can take place, in which the components of the forming and cooling device according to the invention can also be used, in fact, for cleaning.

FIGS. 2 to 6 each show only one revolving cooling belt 2, 3. As shown in FIG. 1, two interacting cooling belts 2, 3 are provided in each case in order to uniformly cool the gap between the two cooling belts 2, 3, in which the strip 6 of food mass is formed. According to the invention, the entire system can also be designed such that the strip 6 of food mass lies on only one revolving cooling belt and, therefore, a second cooling belt is not required in this region.

Figure 2:
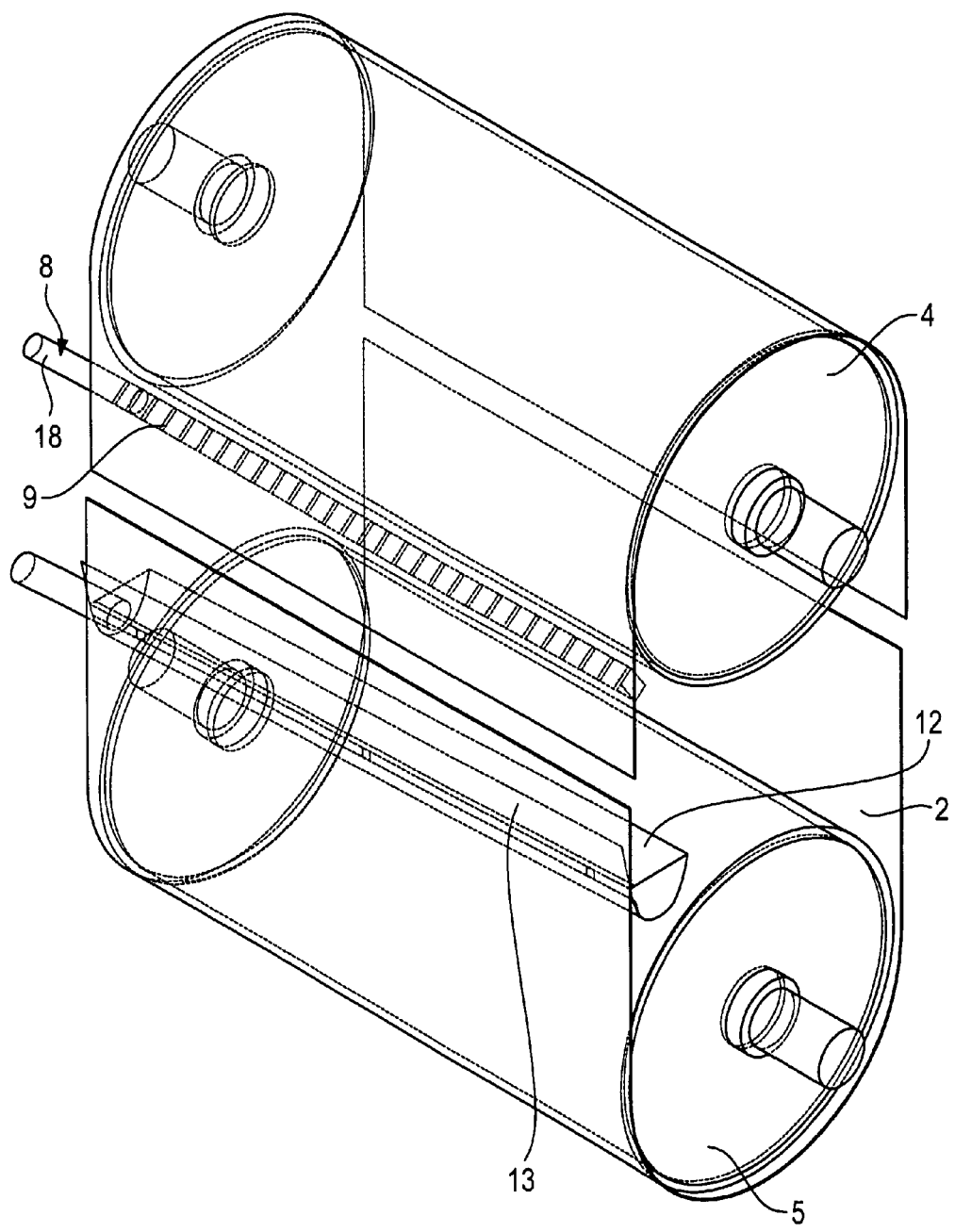
FIG. 2 a perspective partial view, in part as a sectional drawing, of a cooling belt with the supply and drainage of cooling fluid according to the invention, FIG. 3 a simplified side view of the arrangement depicted in FIG. 2, FIG. 4 an enlarged detailed view of the detail B according to FIG. 3, FIG. 5 an enlarged detailed view of the detail C of FIG. 3, FIG. 6 a simplified front view, in part as a sectional drawing, of the arrangement shown in FIGS. 2 to 5, FIG. 7 a perspective depiction of an exemplary embodiment having an adjustable working width, and FIG. 8 an enlarged, simplified sectional view according to the exemplary embodiment 7.
Figure 3:
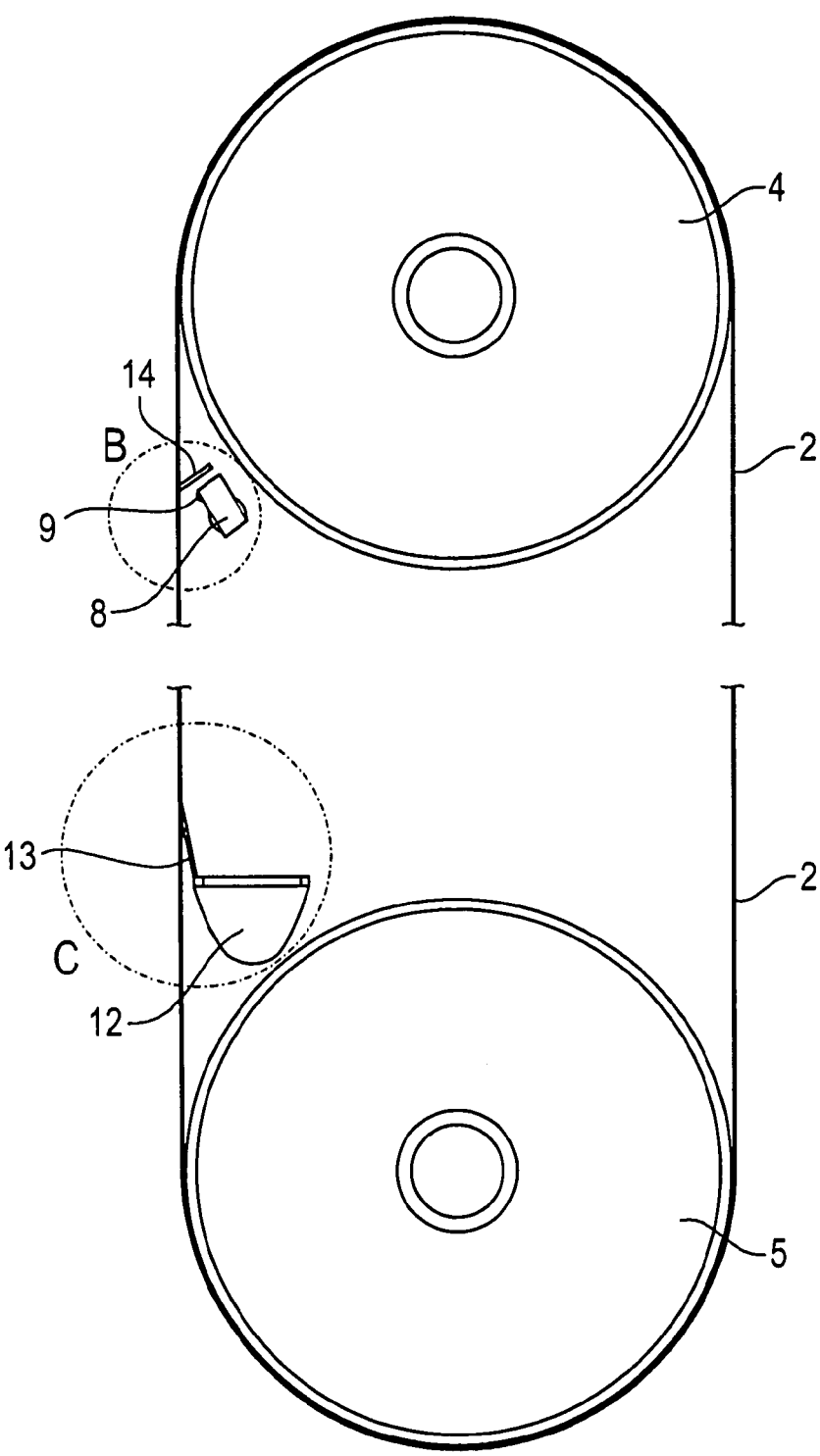
Figure 6:
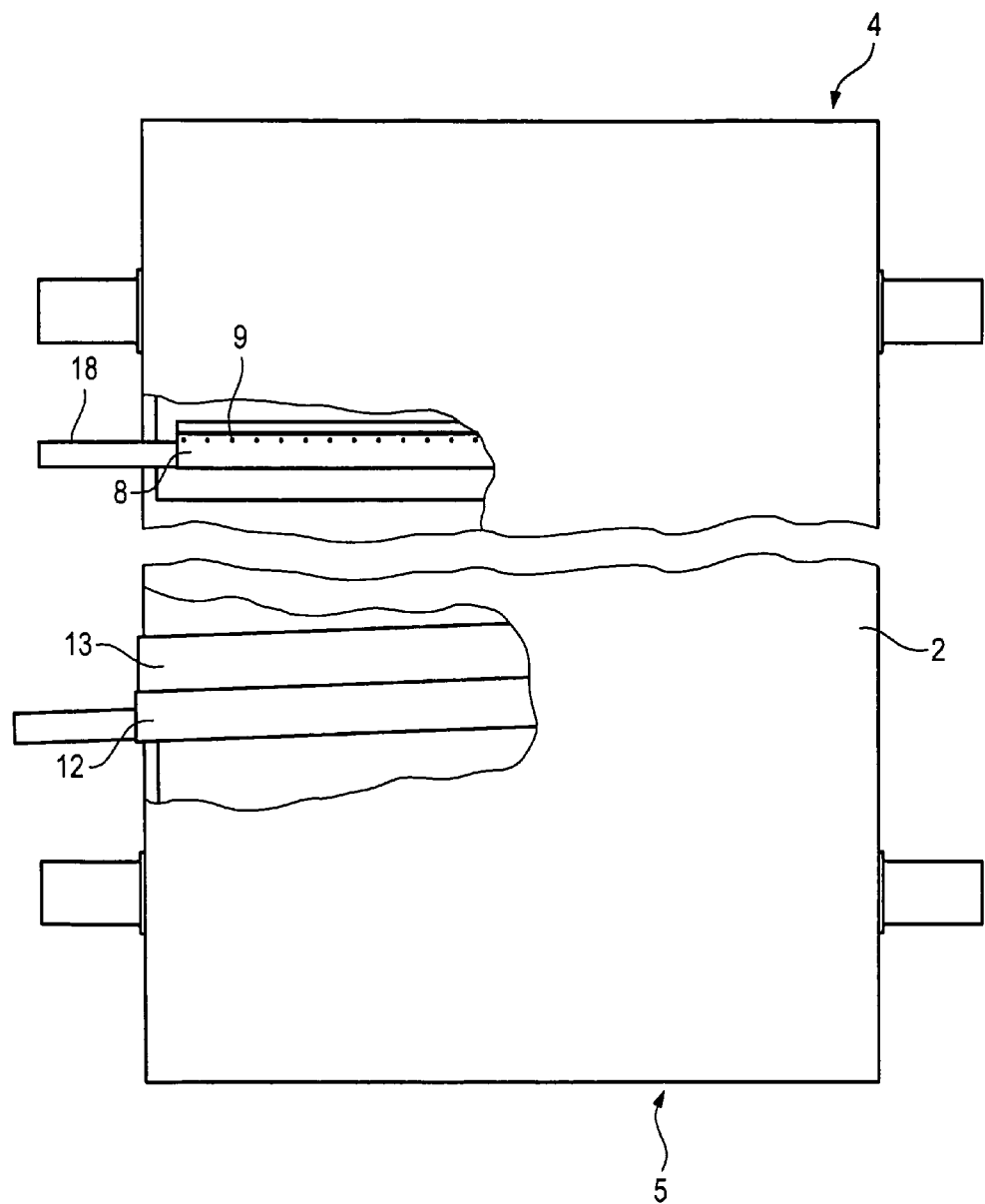

FIGS. 2, 3 and 6 each show an upper deflection roller 4 and a lower deflection roller 5, about which a endless cooling belt 2, which is made of steel, for example, is guided. The cooling belt extends vertically, analogously to the depiction of FIG. 1.

Figure 4:
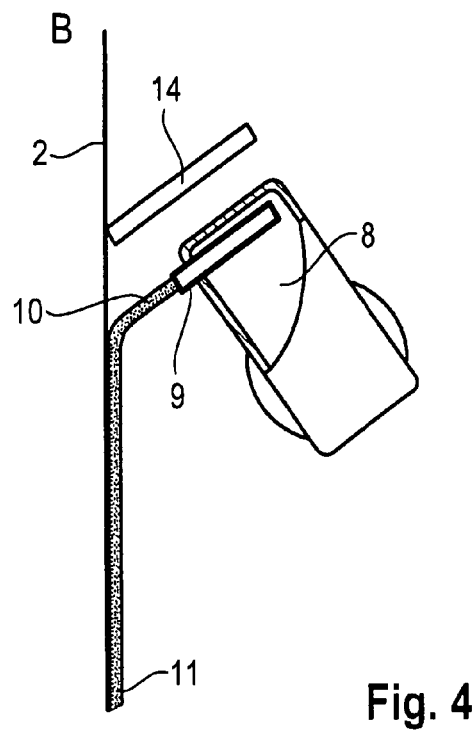
Figure 5:
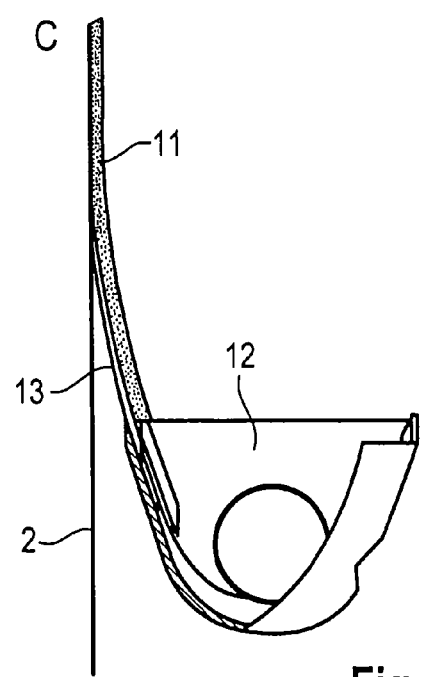

According to the invention, a horizontally disposed, tubular supply channel 8 is provided in the upper region of the cooling belt, as shown in FIG. 3, which forms a storage volume and at which a plurality of outlet conduits 9 is provided, as FIGS. 3 and 4 show in particular. The outlet conduits 9 are equipped with a cylindrical recess and are disposed at the tubular supply channel 8 such that a laminar cooling-fluid stream 10 results (see FIG. 4), which produces a laminar cooling-fluid film 11. The laminar cooling-fluid film 11 is formed by the plurality of outlet conduits 9 arranged side by side.

In the exemplary embodiment shown, the melted food mass is introduced, for example, at a temperature between 75° C. and 85° C., while the cooling fluid (cooling water) has a temperature of 1° C., for example. When the strip 6 of the cooling-medium mass emerges from the cooling belts 2, 3, it has been cooled to a temperature between 5° C. and 10° C., for example.

As shown more particularly in FIG. 4, the laminar cooling-fluid stream 10 does not spray, but rather is placed evenly and uniformly against the surface of the cooling belt 2.

The outlet conduit 9 has a length, for example, between 25 and 30 mm and an inner diameter between 3 and 4 mm. Overall, it is advantageous when a ratio of length to diameter between 5 and 9 results.

By way of the device according to the invention it is possible to apply a uniform cooling-fluid film 11 that flows off uniformly, expands laterally not at all or only insubstantially and adheres well to the surface of the cooling belt. Given a cooling wall width of 1200 mm, for example, cooling-water quantities between 2 $m^3/h$ and 4 $m^3/h$ can therefore be applied.

Figure 7:
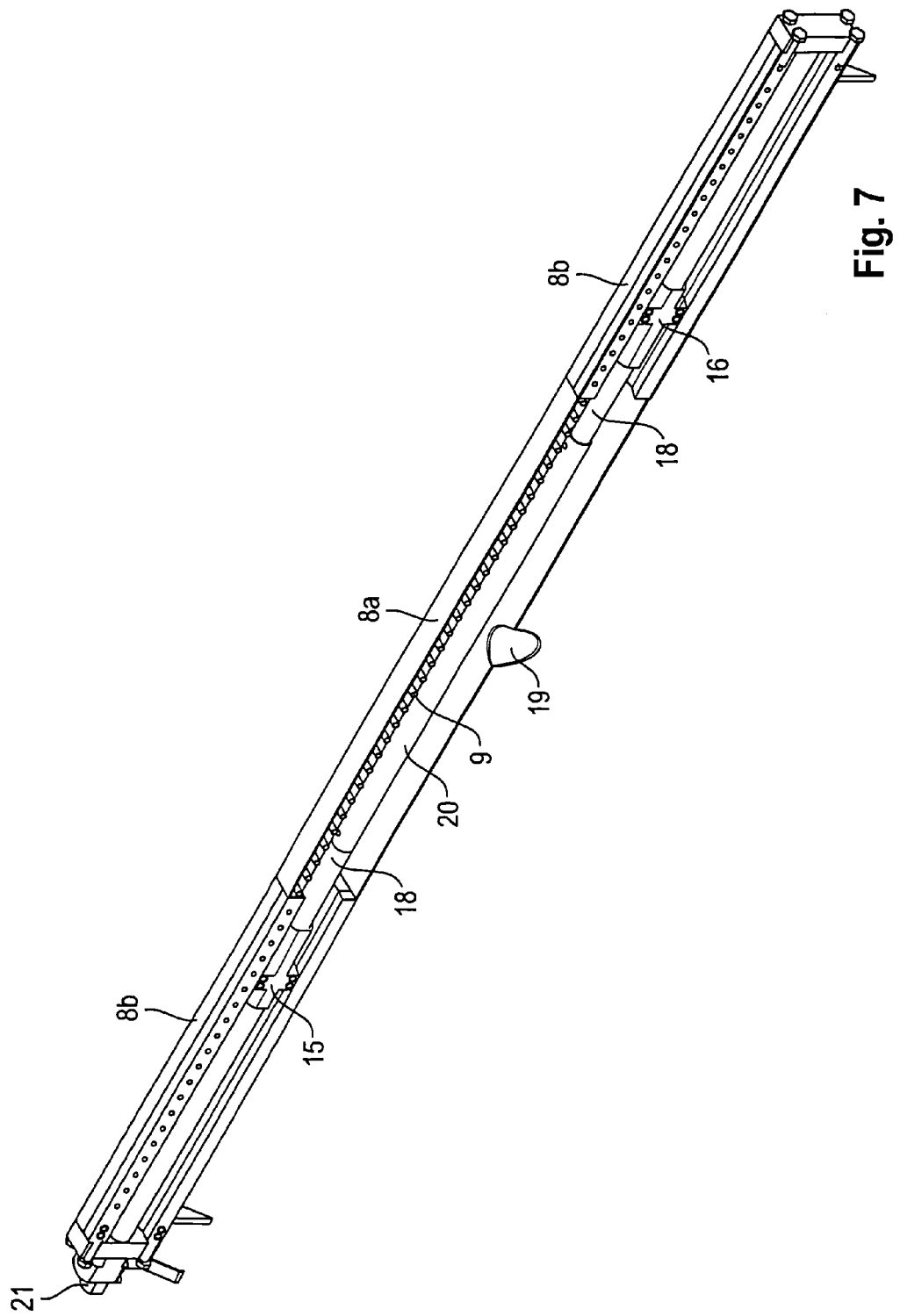
Figure 8:
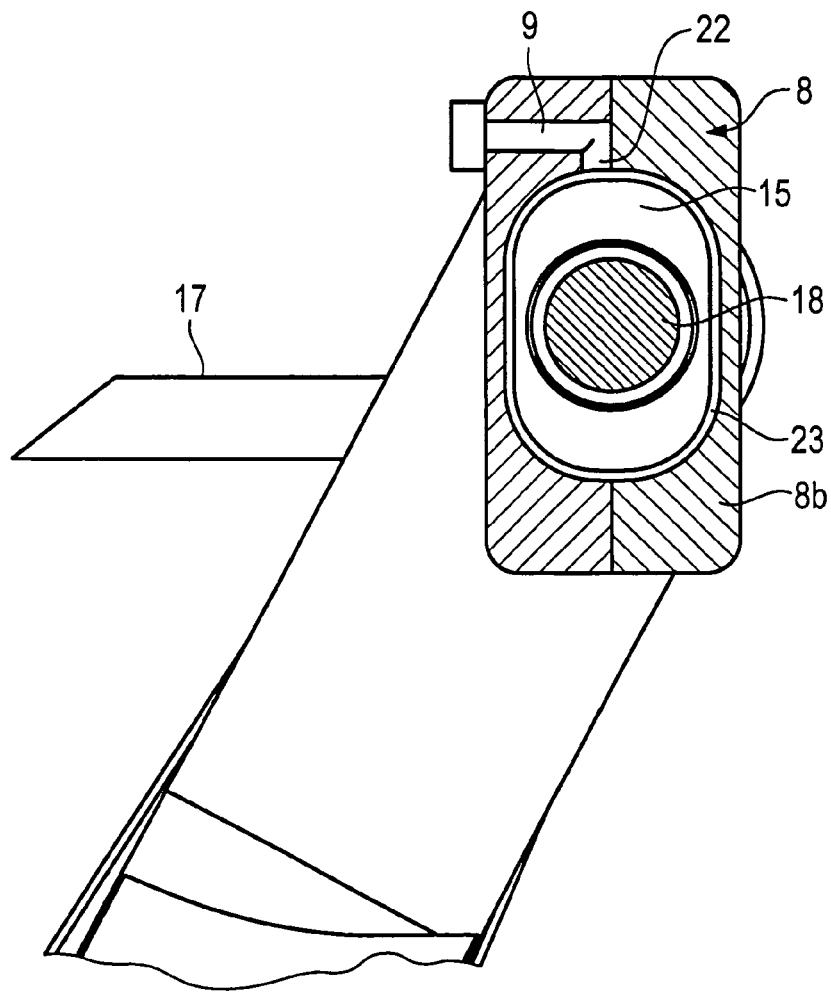

FIGS. 7 and 8 show a further exemplary embodiment of the invention. In this exemplary embodiment, the working width of the cooling device according to the invention is adjustable. It comprises a central region of the drain channel 8, which is designed analogously to the first exemplary embodiment. Cooling fluid is supplied centrally by way of a connecting conduit 18, which is not shown in detail. Lateral supply channels 8b are formed adjoining the central region of the supply channel 8a. They are preferably designed as a two-piece housing, as shown in FIG. 8. Pistons 15, 16, which can be displaced by way of spindles 18, are displaceably supported in this housing. To this end, the spindles 18 are equipped with counter-rotating threads (not shown) and are guided in a spindle housing 20. Connection to a servo drive is possible by way of a drive connection 21. Rotation of the spindles 18 therefore results in linear displacement of the pistons 15, 16.

As shown in FIG. 8, the supply channel 8 is equipped with a longitudinal recess 23. Individual bores 22, which direct cooling fluid to the outlet conduits 9, branch off therefrom. As shown in the depiction in FIG. 7, due to the sealing effect of the piston 15 and 16, respectively, the bores 22 and, therefore, the outlet conduits 9 located laterally outside of the pistons 15, 16, cannot be acted upon by cooling fluid.

To enable cleaning of the entire device, a leakage flow through the pistons 15, 16 is possible. Leakage fluid is fed laterally into run-off openings 17 (protruding pipes) and flow laterally onto the surface of the particular cooling belt.

By rotating the spindles having the counter-rotating threads at both ends, the pistons 15, 16 are therefore moved. The non-round design of the pistons 15, 16 prevents them from rotating therewith. Rather, the pistons are merely displaced.

As shown in FIG. 4, an additional scraper 14 can be provided above the tubular supply channel 8 in order to remove adhering fluid regions, if applicable, from the surface of the cooling belt before the cooling-fluid film 11 is applied. This can be appropriate in particular for cooling belts that run upwardly. The strippers (scrapers) above the application conduit on the upwardly running cooling belts have the purpose of wiping off cooling fluid that has been carried upward before it reaches the upper roller and therefore drips thereon.

According to the invention, the drainage of the cooling fluid takes place by way of a run-off element 12, which is designed in the form of an outflow gutter 12 disposed at a slant (see FIG. 6). It is open toward the top and can therefore be easily cleaned. The introduction of the cooling fluid or the removal of the cooling-fluid film 11 from the surface of the cooling belt 2 takes place by way of an elastic scraper 13 (see FIG. 5), which is fastened on the run-off element 12 in a floatingly supported manner, preferably by way of a plug-and-socket connection.

The device according to the invention is open laterally at the cooling belt 2, 3, it is not necessary to limit the laminar cooling-fluid film 11 by way of lateral webs or the like on the cooling belt 2, 3 since lateral stoppage of the laminar cooling-fluid film 11 does not take place.

According to the invention, the following advantages therefore result:
- a compact and simple design, easy to produce
- exact application of the medium in terms of width and bounded in a straight manner (edge region)
- CIP-capable without an additional conduit system, thermal stability during cleaning
- compensation of surface irregularities in the cooling belt without malfunction
- high temperature range possible without malfunction
- application of the largest possible cooling water quantity
- no complex control or regulation of pressure or flow volume, no complex nozzle shape
- variability of the application quantity of 30-100% without the application system dripping or splashing
- layer thickness uniform across the width
- high functional reliability, no energy consumption, (no noise production)
- no malfunction if the belt runs dry
- fast replacement possible, minimal set-up effort
- no damage to the steel belt, stability.

LIST OF REFERENCE CHARACTERS 1 food mass/processed cheese
2,3 cooling belt
4 upper deflection roller
5 lower deflection roller
6 strip of the food mass
7 cooling fluid
8 tubular supply channel
9 outlet conduit
10 laminar cooling-fluid stream
11 laminar cooling-fluid film
12 drain element/outflow gutter
13, 14 scraper
15, 16 piston
17 run-off opening
18 spindle
19 connecting conduit
20 spindle housing
21 drive connection
22 bore
23 recess

What is claimed is:

1. A forming and cooling device for a flowable, melted food mass (1) comprising two parallel, oppositely rotating cooling belts (2, 3), each belt having an outer surface and an inner surface and an upper region and a lower region, which are each guided over an upper (4) and a lower (5) deflection roller and are separated from each other in order to form a continuous strip (6) of the food mass, wherein the cooling belts (2, 3) are each acted upon by a cooling fluid (7) on the inner surface facing away from the strip, characterized in that a tubular supply channel (8) is formed at the upper region of each cooling belt (2, 3) and is equipped with a plurality of outlet conduits (9) arranged side by side, each outlet opening having a central recess which is cylindrically formed and by way of which a laminar, non-turbulent cooling-liquid stream (10) can be placed upon the inner surface of the cooling belt (2, 3).

2. The device according to claim 1, characterized in that the supply channel (8) forms a storage volume.

3. The device according to claim 1, characterized in that the device is suitable for use of a cooling fluid having a pressure in the range from 0.05 bar to 0.3 bar in the supply channel (8).

4. The device according to claim 1, characterized in that each outlet conduit (9) is disposed slanted at an angle with respect to the inner surface of the cooling belt of 40° to 60°.

5. The device according to claim 1, characterized in that the device is suitable for forming and cooling processed cheese as the flowable, melted food mass.

6. The device according to claim 1, characterized in that each outlet conduit (9) has a ratio of length to diameter of 5 to 9.

7. The device according to claim 1, characterized in that the supply channel (8) is equipped with an adjusting device, by way of which a supply of cooling fluid to some of the outlet conduits (9) is adjustable.

8. The device according to claim 7, characterized in that the adjusting device comprises at least one piston (15, 16) displaceably supported within the supply channel (8).

9. The device according to claim 7, characterized in that the supply channel (8) has lateral end regions and a run-off opening (17) is formed at each lateral end region of the supply channel (8).

10. The device according to claim 1, characterized in that a run-off element (12) for draining off the cooling fluid (7) is disposed underneath the supply channel (8), wherein the run-off element (12) is in the form of an outflow gutter slanted with respect to the horizontal and/or comprises a scraper (13) bearing against the inner surface of the cooling belt (2, 3) and which is elastically preloaded against the inner surface of the cooling belt (2, 3), wherein the scraper (13) is supported at the run-off element (12) by way of a plug-and-socket connection.

11. The device according to claim 10, wherein the run-off element (12) is in the form of the outflow gutter slanted with respect to the horizontal.

12. The device according to claim 10, wherein the run-off element (12) comprises the scraper (13) bearing against the inner surface of the cooling belt (2, 3) and which is elastically preloaded against the inner surface of the cooling belt (2, 3).

13. The device according to claim 8, wherein the supply channel has a central region and first and second lateral end regions wherein each lateral end region extends from the central region to a distal end of the supply channel and the at least one piston (15, 16) comprises two pistons (15, 16) disposed in the lateral end regions of the supply channel (8), which are displaceable by way of a drive.

* * * * *